United States Patent [19]
Chiang

[11] 3,722,458
[45] Mar. 27, 1973

[54] INDICATOR MECHANISM

[76] Inventor: James A. Chiang, 38218 Avondale, Westland, Mich. 48185

[22] Filed: Nov. 20, 1970

[21] Appl. No.: 91,407

[52] U.S. Cl. ..................... 116/129, 73/347, 324/106
[51] Int. Cl. ............................................. G09f 9/00
[58] Field of Search ........ 116/114 Y, 114 Z, 114 AE, 129;
73/346, 345, 347, 362.1, 363, 363.1, 363.5, 362.8, 348, 349; 324/106

[56] References Cited

UNITED STATES PATENTS

| | | | |
|---|---|---|---|
| 2,022,440 | 11/1935 | Slough | 73/347 UX |
| 2,059,272 | 11/1936 | Pickup | 73/363.5 |
| 3,302,460 | 2/1967 | Hennecke et al. | 73/345 |
| 3,493,861 | 2/1970 | Otto | 324/106 |
| 1,802,150 | 4/1931 | Johnson | 177/186 |

*Primary Examiner*—Louis J. Capozi
*Attorney*—John R. Faulkner and Keith L. Zerschling

[57] ABSTRACT

An indicator mechanism particularly useful in an automotive vehicle for indicating various engine operating parameters or conditions, for example, engine coolant temperature and engine oil pressure. The indicator mechanism includes an indicator with means pivotally mounting the indicator freely within the indicator mechanism. An actuating means is mounted in the indicating mechanism and it moves as a function of the parameter or condition to be indicated, and means couple the actuating means and the indicator for causing the indicator to remain in substantially the same position with respect to a scale over a substantial range of movement of the actuating means and, hence, over a substantial range of values of the parameter or condition to be indicated.

1 Claim, 12 Drawing Figures

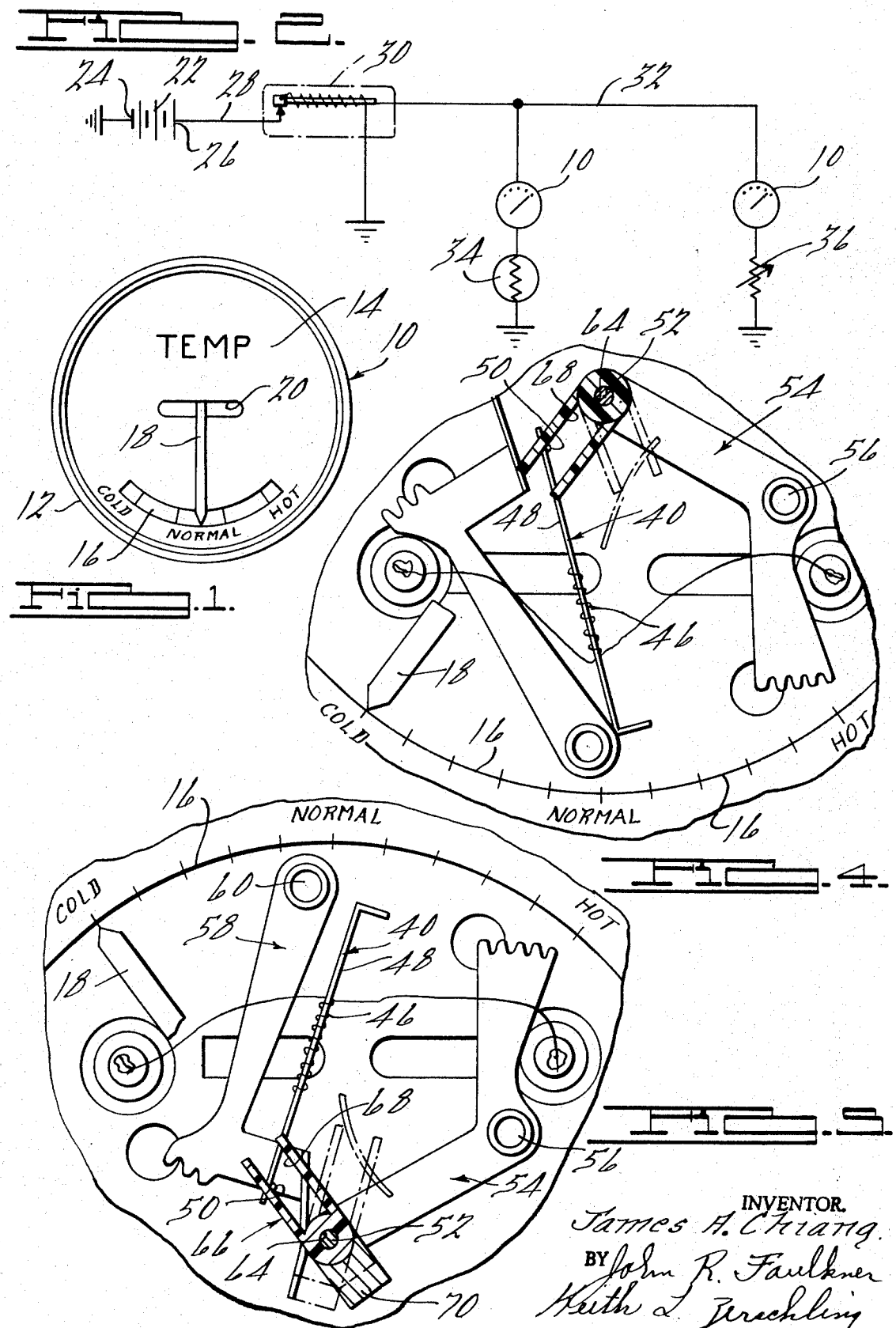

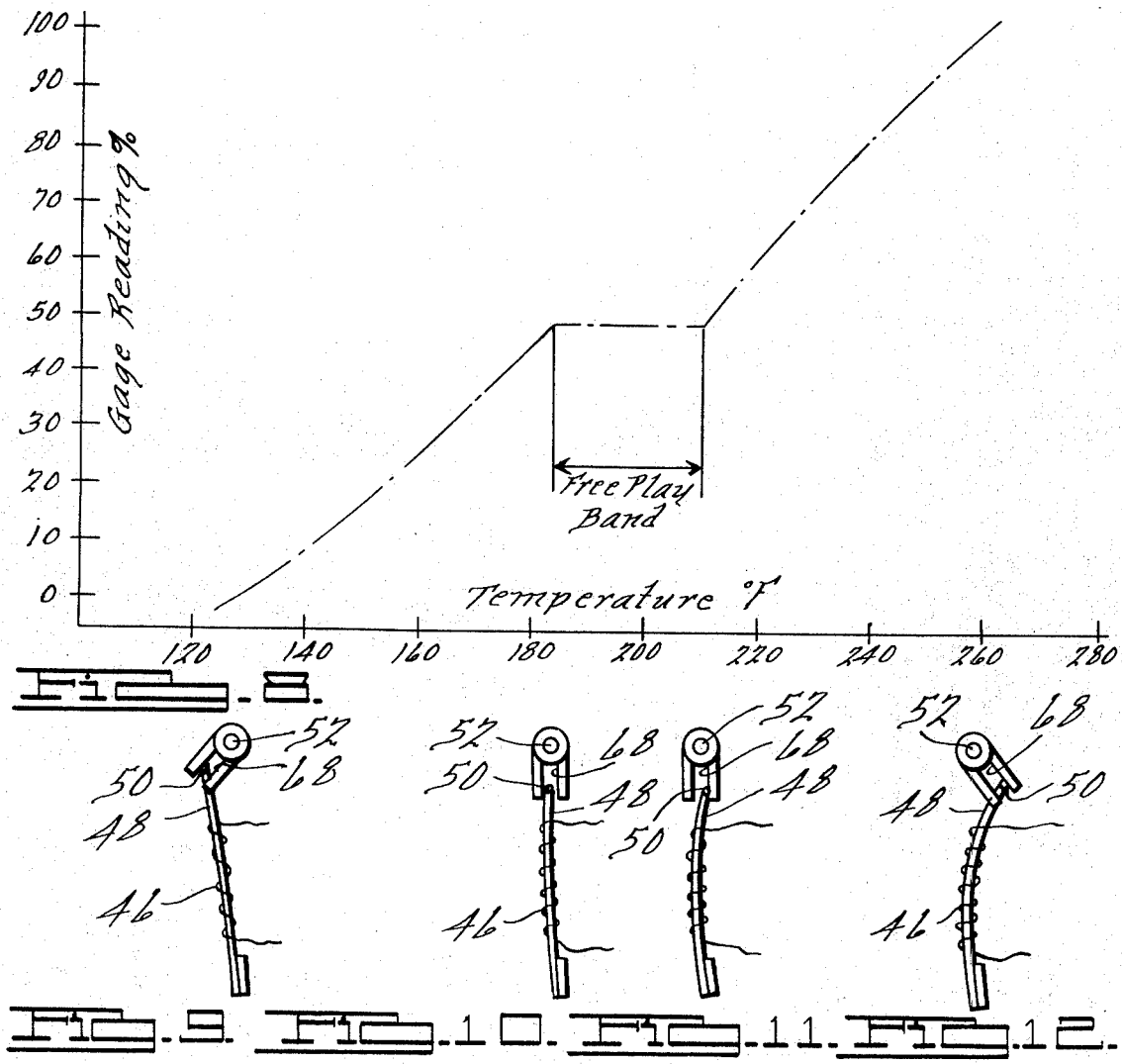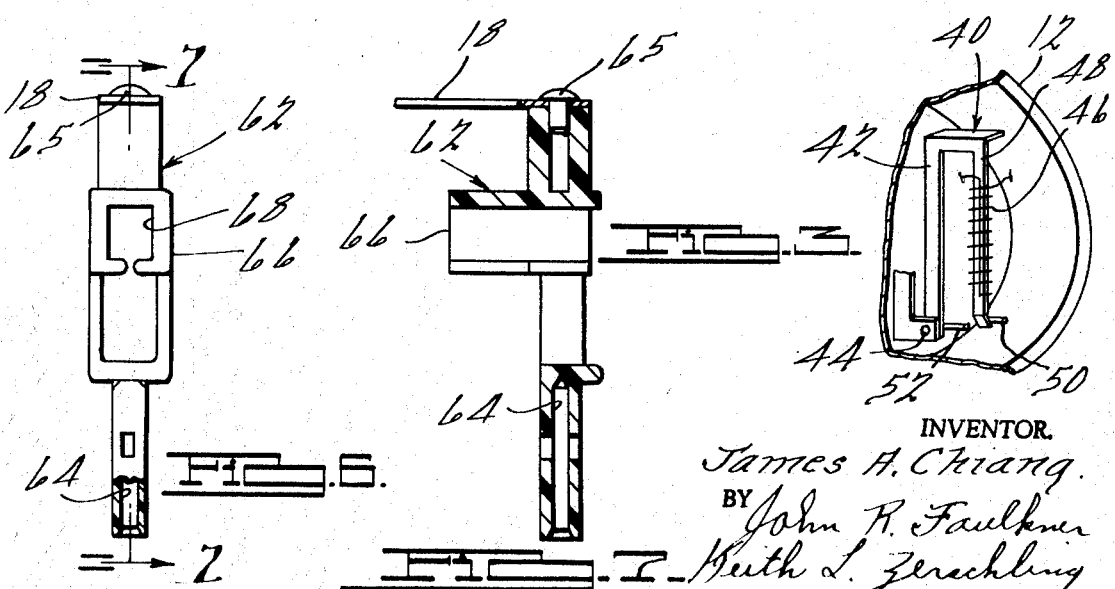

INDICATOR MECHANISM

BACKGROUND OF THE INVENTION

This invention relates to indicator mechanisms and, more particularly, to indicator mechanisms which are useful in indicating the values of various engine operating conditions in an automotive vehicle, for example, engine coolant temperature and engine oil pressure.

Two different systems are currently employed in automotive vehicles to indicate various engine operating conditions, for example, engine coolant temperature and engine oil pressure. One of these systems employs warning lights for indicating to the vehicle operator when an engine operating condition has reached an unsafe or critical level. For example, in certain automobile vehicles produced today, a red warning light will be energized when the engine coolant temperature rises to a critical or unacceptable level. Similarly, a red warning light will be energized when engine oil pressure falls to a critical or unacceptable level. This system has the disadvantage that it does not indicate to the vehicle operator anything with respect to the value of the temperature of the engine coolant or the value of the engine oil pressure over the range of temperatures and pressures encountered in engine operation. Rather, the only time that the vehicle operator is made aware of either of these two conditions is when they reach critical or unacceptable levels.

The other system used in automobile vehicles produced today is a system employing continuously variable gauges that indicate to the vehicle operator the actual values of the engine coolant temperature and engine oil pressure. This system, while of value to the vehicle operator in indicating the temperature and oil pressure at any given moment, does not possess the capability that the other system, described above, has in alerting the vehicle operator when an unacceptable or critical value of these temperatures and pressures has been reached.

The present invention provides a unique and novel indicating mechanism and system for indicating values of a parameter to be measured, for example, engine oil pressure and the engine coolant temperature, on a continuous basis when the values of these parameters are either of a low or high value, while at the same time providing means for alerting an observer or vehicle operator when these values reach critical or unacceptable levels.

SUMMARY OF THE INVENTION

While the present invention is particularly adapted for use in an automotive vehicle to provide indications of engine coolant temperature and engine oil pressure and to alert the vehicle operator when the value of the temperature or pressure reaches a critical or unacceptable state, it may readily be employed to so indicate the value of any parameter that is capable of measurement.

In the invention, an indicator mechanism is provided that includes an indicia means having a scale carried by the indicator mechanism. Means are employed for pivotally mounting the indicator within the indicator mechanism, and actuating means mounted in the indicating mechanism and movable as a function of a parameter to be indicated, for example, engine oil pressure and engine coolant temperature, is also included within this indicator mechanism. Means are provided coupling this actuating means and the indicator for causing the indicator to remain in substantially the same position with respect to the scale over a substantial range of movement of the actuating means. This last mentioned means preferably comprises a lost motion coupling including a pin mounted on the actuating means. The indicator may have a slot positioned therein of substantially greater width than the pin, with the pin being positioned within this slot for movement across the width of the slot as the actuating means moves.

In the preferred embodiment of the invention, the substantial range of movement of the actuating means corresponds to a midrange or normal operating range of the condition or parameter to be measured, for example, engine coolant temperature or engine oil pressure, and means are provided for biasing the indicator to a vertical position which corresponds to the mid or normal range of values of the condition or parameter to be measured.

The invention thus provides for zero or little movement of the indicator over a range of values of the parameter to be measured that are considered to be normal. With respect to engine coolant temperatures, this range may be from approximately 180° to approximately 210°. As the engine coolant temperature rises from a low value to this lower limit of the range, the indicator will move rapidly to this lower limit. Between the lower and upper limits described above, i.e. approximately 180° to 210° with respect to engine temperature, the indicator will remain in one position. If engine coolant temperature rises above the upper limit of the range, i.e. 210°, the pointer will move very rapidly to the value of the engine coolant temperature above this upper limit. As a result of the substantial movement of the indicator, the vehicle operator is apprised quickly of the change in engine coolant temperature to these high or unacceptable values.

An object of the present invention is the provision of an indicator mechanism suitable for indicating internal combustion engine operating conditions in an automotive vehicle.

A further object of the invention is the provision of an indicator mechanism for indicating the value of a parameter to be measured which will alert an observer quickly of abnormal or critical conditions or values of the parameter to be measured.

Still another object of the invention is the provision of an indicator mechanism in which an indicator will remain in substantially the same position over a substantial range of values of a parameter to be measured, for example, over the normal or satisfactory values for proper operation of a machine, for example, an internal combustion engine.

Other objects and attendant advantages of the present invention will become readily apparent as the specification is considered in connection with the attached drawings.

BRIEF DESCRIPTION OF THE DRAWINGS

FIG. 1 is an elevational view of an indicator mechanism of the present invention;

FIG. 2 is a circuit diagram disclosing a system utilizing the present invention;

FIG. 3 is a perspective view of a portion of the indicator mechanism of the present invention;

FIG. 4 is an elevational view, partially in section, showing the working mechanism of one embodiment of the indicator mechanism of the present invention;

FIG. 5 is an elevational view, partially in section, and showing the working mechanism of another embodiment of the indicator mechanism of the present invention;

FIG. 6 is a side elevational view of the indicator or pointer utilized in the indicator mechanism of the present invention;

FIG. 7 is a sectional view taken along the lines 7—7 of FIG. 6;

FIG. 8 is a graph in which a parameter whose values are to be measured, for example, temperature, is plotted against percentage of full travel of the pointer or indicator of the present invention; and FIGS. 9, 10, 11 and 12 are schematics showing the operation of the indicator mechanism of the present invention in relation to the temperatures to be measured as shown in and correlated with FIG. 8.

DESCRIPTION OF THE PREFERRED EMBODIMENTS

The indicator mechanism of the present invention is described in relation to the measurement of internal combustion engine coolant temperature. It is to be understood, however, that the indicator mechanism of the present invention may be utilized in the same way to measure or indicate any parameter the value of which is to be indicated.

Referring now to the drawings, in which like reference numerals designate like parts throughout the several views thereof, there is shown in FIG. 1 an engine coolant temperature indicator mechanism or gauge 10 having a housing 12 and a cover or plate 14 positioned over an open end of the housing. The cover or plate 14 has an indecia including a scale 16 positioned thereon to indicate, in cooperation with a movable indicator or pointer 18, the value of a parameter to be measured, for example, internal combustion engine coolant temperature. The movable indicator or pointer 18 extends through an aperture or slot 20 in the cover or plate 14.

Referring now to FIG. 2, there is shown a circuit diagram of a system in which the indicator mechanism of the present invention may be employed. As shown here, this system is a gauge system for an automotive vehicle and is employed to indicate to a vehicle operator the temperature of the internal combustion engine coolant and the pressure of the oil employed to lubricate the engine. In this system, a source of electrical energy or storage battery 22 has its negative terminal 24 connected to ground and its positive terminal 26 connected through lead 28 to a constant voltage regulator 30 of known configuration. The output of the constant voltage regulator is in the form of pulses applied to a line 32.

The indicator mechanism 10 of the present invention is connected in series with a thermistor 34 and this series combination is connected between line 32 and ground. The thermistor 34 may be positioned in heat transfer relation to the internal combustion engine coolant of the vehicle. As the temperature of the engine coolant increases, the resistance of the thermistor decreases and, as a result, current flow through the indicator mechanism 10 and thermistor 34 increases.

Another indicator mechanism 10 may be employed to indicate engine oil pressure and it is connected in series with a variable resistor 36 and this series combination is connected between line 32 and ground. As the pressure of the engine oil increases, the resistance value of the variable resistor 36 is designed to decrease, thereby increasing current flow through the indicator mechanism 10 and the variable resistor 36.

FIG. 3 discloses a preferred form of the actuating means for actuating or moving the indicator or pointer 18 in accordance with the value of the parameter to be measured. This actuating means includes a bimetal strip or actuator member 40 which includes an ambient temperature compensating leg 42, riveted or otherwise suitably secured at 44 to the indicator housing or casing 12 which is shown partially in section. A heater coil 46 partially surrounds another leg 48 of the bimetal strip or actuator member 40. This heater winding 46 is connected in series with the thermistor 34 or the variable resistor 36, as the case may be, as shown in FIG. 2.

The end of the leg 48 of the bimetal strip or actuator member 40 has a pivot pin 50 affixed thereto. As current through the winding 46 increases, the leg 48 flexes or warps under the heat generated by the heater winding 46 and moves the pivot pin from the left to the right, as shown in FIG. 3. Another pivot pin 52 is affixed to the housing or casing 12 in spaced relationship to the pivot pin 50 mounted on the end of leg 48 of the bimetal strip or actuator member 40.

As more specifically shown in FIG. 5, the pivot pin 52 may be mounted on a movable adjusting mechanism 54 which is pivotally mounted at 56 to the rear wall of the housing or casing 12. Additionally, the ambient temperature compensating leg 42, which is riveted or otherwise suitably secured to the casing or housing 12, may be secured thereto through an adjusting mechanism 58 which is pivotally mounted to the rear wall of the housing or casing 12 at 60. The two adjusting mechanisms 54 and 58 may be used in the factory to set the zero point of the indicator or pointer 18 with respect to the scale 16.

The indicator or pointer 18 is secured, as shown at FIGS. 6 and 7, to an indicator pivot shaft generally designated by the numeral 62. This shaft has an axial opening 64 at one end thereof which pivotally receives the pivot pin 52, as shown more specifically in FIG. 5. The indicator or pointer 18 is suitably secured to the other end of the indicator pivot shaft by means of a suitable rivet or fastening mechanism shown at 65. The indicator pivot shaft 62 also includes a radially extending rectangular protuberance 66 having a slot or opening 68 positioned therein for the reception of the pivot pin 50, as more specifically shown in FIG. 5.

The indicator mechanism shown in FIG. 5 includes a scale 16, as shown in FIG. 1, with the pivot pin 52 mounted below the scale 16. The embodiment shown in FIG. 4 is similar to that shown in FIG. 5 except that the scale 16 is positioned below the pivot pin 52 on which the indicator pivot shaft 62 is mounted.

In each of the embodiments shown in FIGS. 4 and 5, means are provided for biasing the indicator 18 into a vertical position. In the case of the embodiment shown in FIG. 4, the weight of the pointer or indicator 18, as well as the weight of the protuberance 66 on the indicator pivot shaft 62, accomplish this biasing action. With respect to FIG. 5, a counterweight 70 is attached to the end 64 of the indicator pivot shaft 62.

As specifically shown in FIGS. 4 and 5, the width of the slot 68 in the protuberance 66 of indicator pivot shaft 62 is substantially greater than the diameter of the pivot pin 50 mounted on leg 48 of the bimetal strip or actuator member 40.

The operation of the invention will now be described in relationship to the embodiment shown in FIGS. 1 and 4. FIG. 8 is a graph of the movement of the indicator or pointer 18 in response to the movement of the pivot pin 50 as it moves through its range of movement due to the varying currents through the heater winding 46 that occur because of the variations in the values of the thermistor 34 shown in FIG. 2. As previously pointed out, this thermistor 34 is positioned in heat transfer relationship to the engine coolant of an internal combustion engine and its resistance value decreases as the temperature of the engine increases, and preferably this relationship is linear.

Both FIG. 4 and FIG. 9 disclose the position of the various parts of the indicator mechanism of the present invention when there is a relatively small amount of current through the heater winding 46 due to low engine coolant temperatures. The relationship of the position of the two pins 50 and 52 is such that the leg 48 of the bimetallic strip or actuator member 40 will force the pointer 18 and the indicator pivot shaft into the position shown in FIGS. 4 and 9 by engagement of the pivot pin 50 with the wall on the left hand side of the slot 68. As engine temperature increases and the resistance of the thermistor decreases, increased current will flow through the heater winding thereby flexing the end of leg 48 and pin 50 to the right and permitting the weight of the pointer or indicator 18 and the indicator pivot shaft 62 to move the pointer or indicator 18 to the right, as shown in FIG. 4 and in FIG. 1. The position of the parts is so arranged that, when the lower limit of a Free Play Band is reached, the pin 50 will lightly engage the left hand side of the slot 68 and the indicator or pointer 18 will be in a substantially vertical position as shown in FIG. 10. As the temperature of the engine coolant continues to rise above this lower limit, the pin 50 will move to the right due to increasing flexure of the leg 48 of the bimetal strip or actuator member 40. At this time, the pin 50 moves across the width of the slot 68 until the temperature of the engine coolant reaches the upper limit of the Free Play Band. At this time, the pivot pin 50 will come into engagement with the right hand side of the slot 68 as shown in FIG. 11. During the temperatures encountered in this Free Play Band, the pointer or indicator 18 will, of course, remain in the vertical or midrange position.

When the temperature of the engine coolant rises above the upper limit of this Free Play Band, the pin 50 will move further to the right and will force the indicator pivot shaft 62 and, hence, the pointer or indicator 18 to the right and further up scale, as more specifically shown in FIG. 12.

The Free Play Band referred to above covers the range of engine coolant temperatures considered to be normal when an internal combustion engine has reached full or normal operating temperatures. This normal temperature range may extend from approximately 180°F to 210°F. Thus, when engine coolant temperatures are within this range, there is no movement of the pointer or indicator 18. If, however, the temperature of the engine coolant rises above the upper limit of the normal temperature range, for example, 210°F, very significant movement of the pointer or indicator 18 takes place thereby calling the attention of the vehicle operator to the fact that the engine coolant temperature is above the normal operating range and is at a critical or unsatisfactory value.

It can be appreciated that the width of the Free Play Band may be increased or decreased in desired amounts by increasing or decreasing the width of the slot 68.

The embodiment shown in FIGS. 3 and 5 will, of course, operate in exactly the same manner as the embodiment shown in FIGS. 1 and 4, and as described in relationship to FIGS. 8 through 12.

It should be understood that the same action will take place when the indicator mechanism 10 is employed in the circuit in FIG. 2 to indicate engine oil pressure, and that there will be no movement of the indicator or pointer 18 in the range of oil pressures that is considered to be normal for the particular engine with which the system is associated. In this case, however, the critical values of engine oil pressure are usually those pressures below the normal or mid-range. Thus the pointer or indicator 18 will move from the vertical position to the lower end of the scale 16 when these critical or unacceptable values of engine oil pressure occur.

It should also be understood that both the embodiments of the invention shown in the drawings and described above may be employed to measure any other parameter where it is desired to provide a means for alerting or apprising an operator or observer of an abnormal condition or value in the parameter being measured or indicated.

I claim:

1. An indicator mechanism, which comprises: a housing; a cover plate having an indicating scale thereon, said cover plate being positioned on said housing; an adjusting mechanism pivotally mounted on said housing; a pivot pin mounted on said adjusting mechanism; an indicator pivot shaft having an axial opening therein, said axial opening receiving said pivot pin to permit said pivot shaft to rotate about said pivot pin, said pivot shaft also including a radially extending rectangular protuberance having a slot therein; an indicator attached to said pivot shaft; a warpable bimetal actuator strip, said bimetal actuator strip being U-shaped and having a first leg and a second leg, said first leg being affixed to said housing; an actuator pin affixed to the end of said second leg of said bimetal actuator strip, said actuator pin being received by said slot in said radially extending protuberance of said pivot shaft, said actuator pin having a diameter less than the width of said slot; and means for biasing said indicator to a mid-scale position on said cover plate.

* * * * *